(12) United States Patent  (10) Patent No.: US 7,779,549 B2
Garau  (45) Date of Patent: Aug. 24, 2010

(54) HORIZONTAL-ARM COORDINATE MEASURING MACHINE

(75) Inventor: Enrico Garau, Turin (IT)

(73) Assignee: Hexagon Metrology S.p.A., Moncalieri (IT)

( * ) Notice: Subject to any disclaimer, the term of this patent is extended or adjusted under 35 U.S.C. 154(b) by 0 days.

(21) Appl. No.: 12/297,429

(22) PCT Filed: Apr. 18, 2006

(86) PCT No.: PCT/IT2006/000255

§ 371 (c)(1),
(2), (4) Date: May 14, 2009

(87) PCT Pub. No.: WO2007/119253

PCT Pub. Date: Oct. 25, 2007

(65) Prior Publication Data

US 2009/0265945 A1    Oct. 29, 2009

(51) Int. Cl.
*G01B 5/008*    (2006.01)
*G01B 5/02*    (2006.01)

(52) U.S. Cl. .................. 33/503; 33/832

(58) Field of Classification Search ........... 33/832–833, 33/783–784, 792–793, 803, 805, 813, 831, 33/556, 559, 503, 1 M See application file for complete search history.

(56) References Cited

U.S. PATENT DOCUMENTS 3,785,056 A * 1/1974 Schiler .................. 33/559
3,956,995 A   5/1976 Lecordier et al.
4,097,996 A * 7/1978 Yamazawa et al. ........... 33/1 M
4,459,755 A * 7/1984 Gruhler .................. 33/832
4,766,674 A * 8/1988 Zanier et al. .................. 33/503
4,835,871 A   6/1989 Pesikov et al.
4,845,855 A * 7/1989 Meyer .................. 33/832
4,924,598 A * 5/1990 Gruhler .................. 33/832
4,949,465 A * 8/1990 Pesikov .................. 33/1 M
4,961,267 A * 10/1990 Herzog .................. 33/503
4,964,221 A * 10/1990 Breyer et al. .................. 33/503
5,040,308 A * 8/1991 Meyer .................. 33/832
5,062,501 A   11/1991 Pavoz et al.
5,072,522 A * 12/1991 Stott et al. .................. 33/503
5,131,166 A * 7/1992 Weber .................. 33/832
5,373,645 A * 12/1994 Bezinge et al. .................. 33/703
6,467,184 B1  10/2002 Wuest et al.
6,763,604 B2 * 7/2004 Jordil et al. .................. 33/832
6,802,135 B2 * 10/2004 Jordil et al. .................. 33/832

(Continued)

FOREIGN PATENT DOCUMENTS

DE    1798419 B    3/1972

(Continued)

*Primary Examiner*—Yaritza Guadalupe-McCall
(74) *Attorney, Agent, or Firm*—Orrick Herrington & Sutcliffe, LLP

(57) ABSTRACT

A coordinate measuring machine comprising a base provided with guides parallel to a first X axis, a first carriage mobile on the guides along the X axis and provided with an upright, a second carriage carried by the upright and mobile along a second vertical Z axis, and a horizontal-arm carried by the second carriage and axially mobile along a third horizontal Y axis perpendicular to the X axis; a counterweight, fastened to the second carriage by means of a belt, is mobile along the Z axis within the upright and is provided with wheels in contact with side walls of the upright.

13 Claims, 3 Drawing Sheets

U.S. PATENT DOCUMENTS

| | | |
|---|---|---|
| 7,191,540 B1 * | 3/2007 | Brewer et al. ................. 33/551 |
| 7,263,786 B1 * | 9/2007 | Zanier ......................... 33/832 |
| 7,434,331 B2 * | 10/2008 | Zanier ......................... 33/832 |
| 2003/0106233 A1 * | 6/2003 | Jordil et al. .................. 33/832 |
| 2003/0106236 A1 * | 6/2003 | Jordil et al. .................. 33/832 |
| 2007/0245586 A1 * | 10/2007 | Zanier ......................... 33/832 |
| 2009/0320304 A1 * | 12/2009 | Lin ............................. 33/354 |

FOREIGN PATENT DOCUMENTS

DE      4205644 A1      8/1993

\* cited by examiner

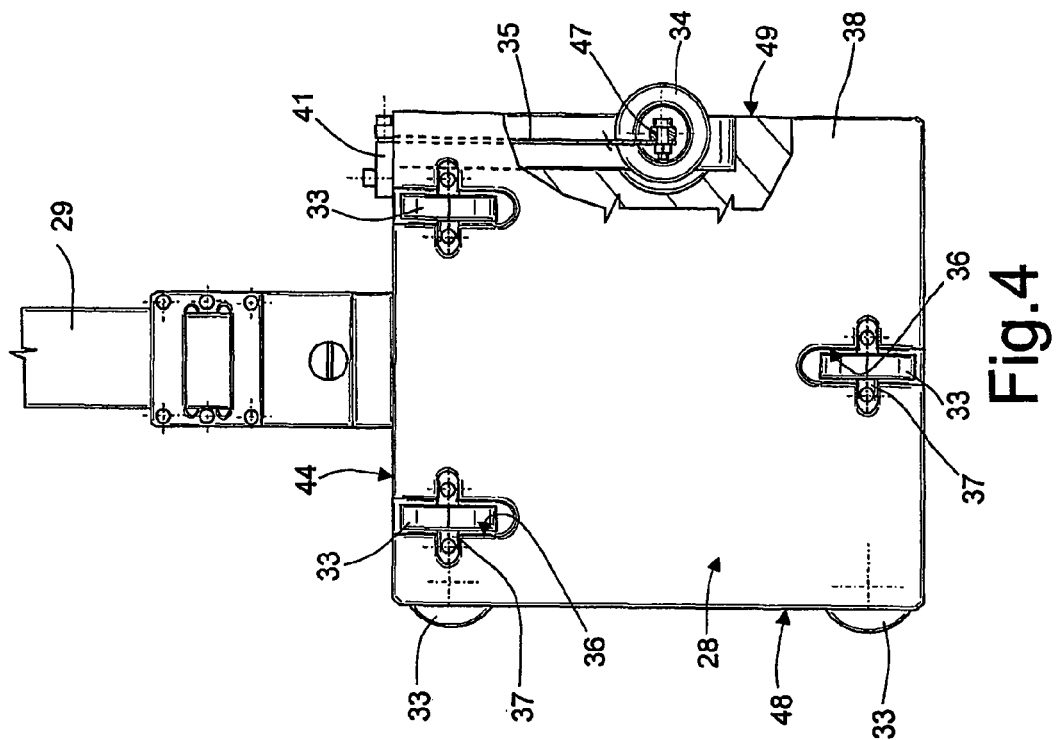
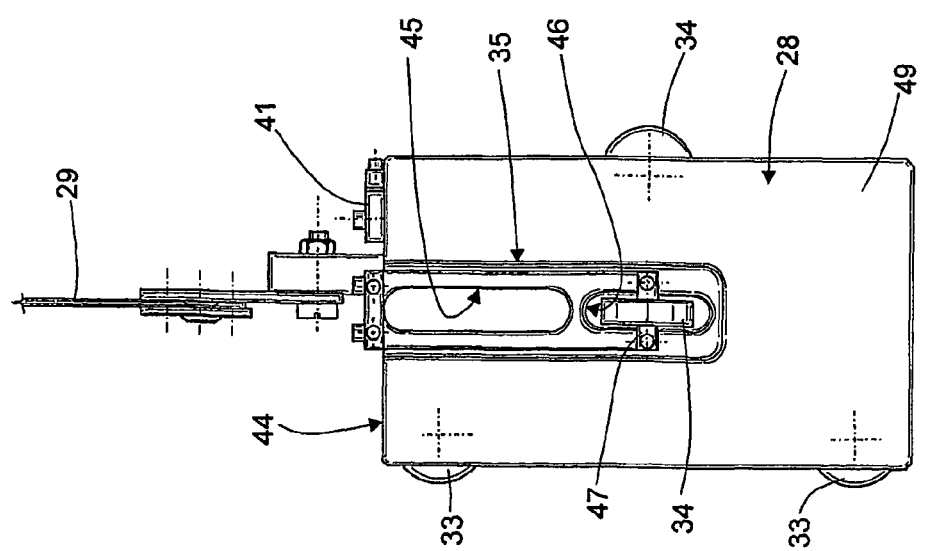

HORIZONTAL-ARM COORDINATE MEASURING MACHINE

TECHNICAL FIELD

The present invention relates to a coordinate measuring machine of the horizontal-arm type.

BACKGROUND ART

Coordinate measuring machines of the aforesaid type are known, comprising a base provided with guides along which a first horizontal X axis, a first carriage mobile on the base along the X axis and comprising an upright provided with guides extending along a second vertical axis, a second carriage carried by the upright and sliding on the same along Z axis, and an arm carried by the second carriage and extending along a third horizontal Y axis orthogonal to the X axis. One end of the arm is adapted to carry a contact or optical detector for measuring dimensional features of parts.

For the purpose of maintaining the second carriage balanced, the machines of the aforesaid type are generally provided with a counterweight secured to the second carriage by means of a belt and sliding within the upright.

More specifically, the upright is internally provided with vertical guides along which the counterweight moves.

This solution entails high manufacturing costs because the upright must be machined with the due accuracy, generally made by extrusion, to obtain the resting surfaces for the guides, and due to the cost of the guides.

DISCLOSURE OF INVENTION

It is therefore the object of the present invention to make a horizontal-arm coordinate measuring machine which allows to solve the aforesaid technical problem.

The present object is achieved by a measuring machine according to claim 1.

BRIEF DESCRIPTION OF THE DRAWINGS

For a better understanding of the present invention, a preferred embodiment will now be described by way of non-limitative example, and with reference to the accompanying drawings, in which:

FIGS. 3 and 4 are side and rear elevation views, respectively, of a counterweight of the machine in FIG. 1.

BEST MODE FOR CARRYING OUT THE INVENTION

Figure 1:
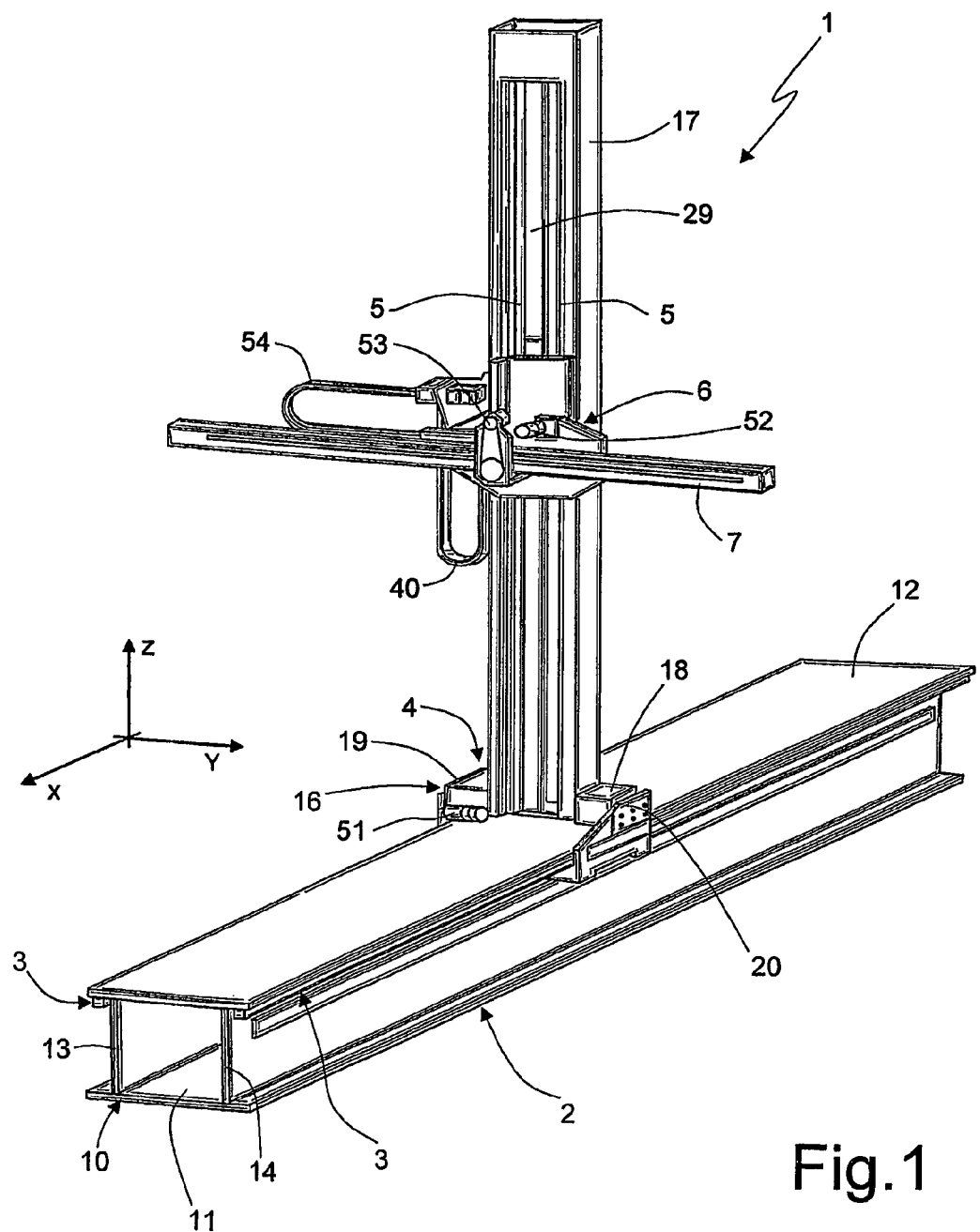
FIG. 1 is a perspective view of a horizontal-arm coordinate measuring machine, according to the present invention.

In FIG. 1, it is indicated as a whole by 1 a horizontal-arm coordinate measuring machine.

The machine 1 essentially comprises a base 2 provided with guides 3 along a horizontal X axis, a first carriage 4 mobile on the base 2 along the X axis and provided with guides 5 extending along a vertical Z axis, a second carriage 6 carried by the first carriage 4 and sliding along the Z axis, and a horizontal-arm 7 carried by the second carriage 6, extending along a Y axis orthogonal to the X axis and axially mobile along the Y axis. One end of the arm 7 is adapted to carry a contact or optical detector (not shown) for measuring dimensional features of parts.

More in detail, base 2 essentially consists of a boxed structure 10 elongated in the direction of the X axis, with constant section, having a flat horizontal lower wall 11 and upper wall 12, and a pair of vertical, reciprocally parallel side walls 13, 14. The side walls 13, 14 are reciprocally spaced at a distance smaller than the width of the walls 11, 12 so that they laterally protrude from the lateral walls 13, 14 with respective side wings 15.

The sliding guides 3 for the upright 4 along axis X are fixed under the side wings 15 of the upper wall 12, which therefore presents a flat floor-like upper surface, being free from guides and delicate components.

The first carriage 4 comprises a lower base 16 mobile on the guides 3 and an upright 17 having a vertical axis tubular structure which extends upwards from the base 16 and carries the guides 5 of carriage 6.

More precisely, the base 16 consists of a central body 18 rigidly fastened to the upright 17 and by a pair of side shoulders 19, 20 fastened on opposite sides of the central body 18 and each sliding along a respective guide 3 by means of runners (not shown), for example of the ball circulation or pneumatic-static type.

The upright 17 (FIG. 2) has a tubular structure, with constant section, and is conveniently made of a C-section 23 defining a rear wall 24 and respective side walls 25 of the upright 17, and by a frontal plate 26 fastened, preferably welded, along the free sides of the section 23.

Guides 5 for the second carriage 6 are frontally fastened to the front plate 26 of the upright 17 and cooperate with runners 21, for example of the ball circulation or pneumatic-static type carried by the second carriage (6).

The section 23 and the frontal plate 26 delimit an internal cavity 27 of the upright 17, with essentially rectangular section.

Within the aforesaid cavity 27 is accommodated a counterweight 28, which is secured to the second carriage 6 by means of a belt 29. More specifically, the belt 29 has ends fastened to the second carriage 6 (FIG. 1) and to the counterweight 28 (FIGS. 3 and 4), respectively, and is wound about an idle pulley 30 (FIG. 2) placed near an upper end of the upright 17 and turning about a shaft 31 with horizontal A axis parallel to axis Y.

The counterweight 28 (FIGS. 3 and 4) presents an essentially parallelepiped shape and is guided within the cavity 27 of the upright 17 by means of a plurality of wheels 33, 34 carried by the counterweight and placed directly in contact with the walls of the upright 17. Some of the wheels, indicated by number 33, have fixed axis; other wheels, indicated by number 34, are fitted on respective blade springs 35 adapted to generate an elastic preload. Parallelly to each of the axes X and Y, the counterweight 28 is supported in one direction by a plurality of fixed axis wheels 33, and in the other direction by a wheel 34, so as to ensure clearance take-up.

Figure 2:
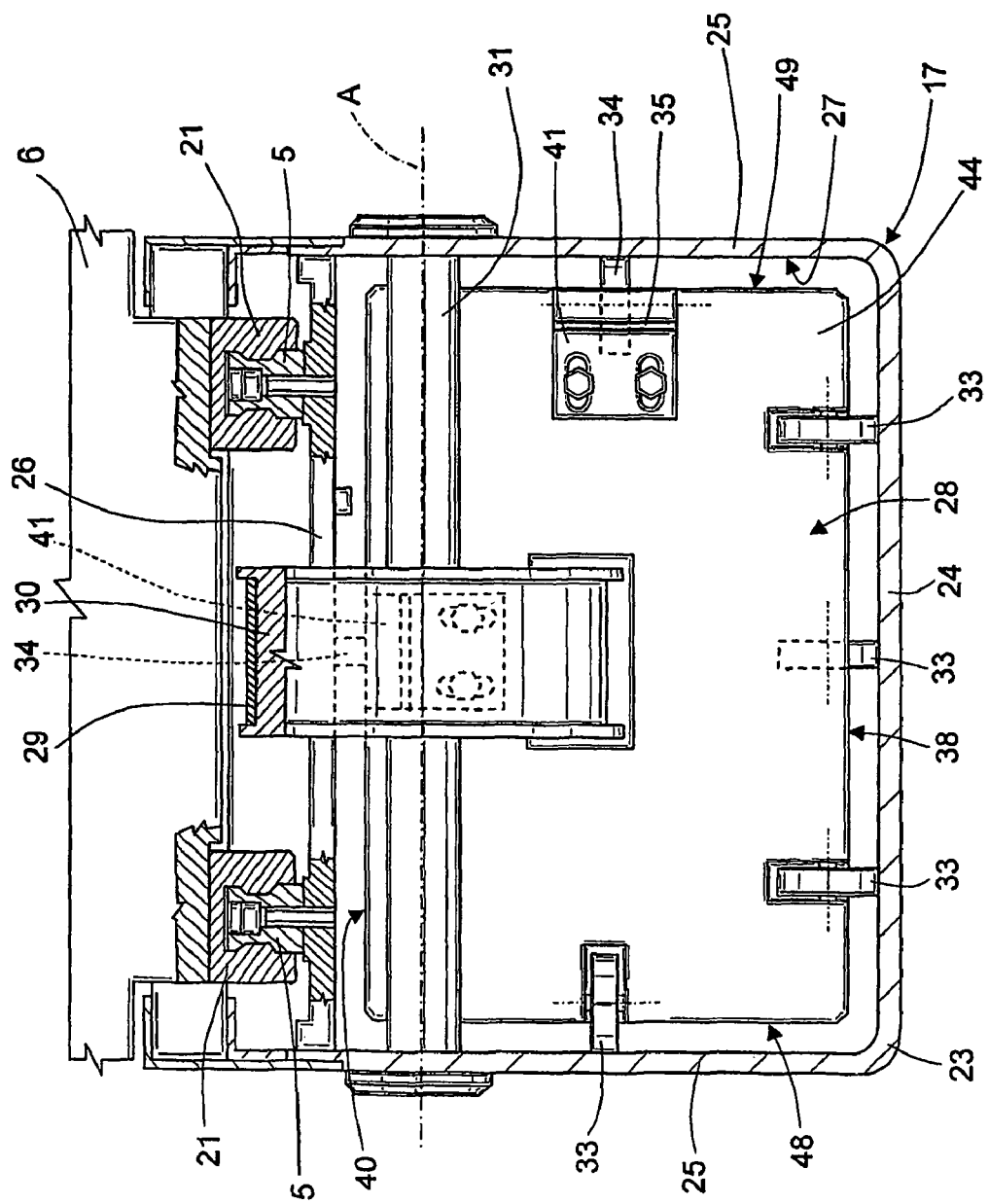
FIG. 2 is a top view of an upright of the machine in FIG. 1.

In particular, on one rear face 38 of the counterweight 28 (FIG. 4) there are fitted two fixed axis wheels 33, two of which near the upper corners of face 38 and one on the middle line near a lower side of the face itself. Such wheels 33 therefore define respective unidirectional rests against the rear wall 24 of the upright 17 (FIG. 2).

The elastic rest in the opposite direction, i.e. against the frontal plate 26 of the upright 17, is defined by a wheel 34 supported by the respective spring 35 in the middle of a front face 40 of the counterweight 28.

Two wheels 33 are further mounted on a side face 48 of the counterweight, on the middle line of face 48 and near the upper and lower sides of the same. Such wheels define respective rests against a side wall 25 of the upright 17. One wheel 34 is supported by a respective spring 35 in central position on a side face 49 opposite to the counterweight 28, and rolls in contact with the side wall 25 opposite the upright 17.

The wheels 33 are mounted in respective recesses 36 of the counterweight 28 and turn about respective pins 37 recessed into the counterweight 28 and fastened thereto.

The springs 35 of the wheels 34 are each protrudingly fastened to a respective block 41 fastened to an upper face 44 of the counterweight 28 and parallelly extend to the respective face 40, 49 of the counterweight 28.

Each spring 35 (FIGS. 3 and 4), of essentially rectangular shape elongated in the vertical direction, presents an upper slot 45 and a lower slot 46, through and reciprocally aligned along the longitudinal middle line of the spring. Wheel 34 is accommodated in the lower slot 46 and turns about an axis 47 fastened as a bridge over the slot itself.

The anchoring system determined by the wheels 33 and 34 is isostatic and eliminates all degrees of freedom, except for translation along the Z axis; the anchoring system is however elastic and therefore both capable of tolerating possible surface irregularities of the walls of upright 17, which have a relatively rough finish deriving from the employed metallurgic manufacturing process, and capable of taking up clearance, thus ensuring regular movement of the counterweight 28. The elastic anchoring system is dimensioned so as to contrast inertia forces which are generated on the accelerating counterweight 28.

Conveniently, the wheels 33, 34 are either made of or coated with elastomeric material having a high resistance to wear and good damping capacities, e.g. a cellular polyurethane elastomer.

The mobile parts of the machine are driven, in a way per se known, by means of rack and pinion devices (not shown), driven by respective electrical motors 51, 52, 53.

The connection of the electrical motors 51, 52, 53 to the respective power and control system (not shown) is achieved by means of wirings (not shown), which in the transition zones between relatively moving parts are accommodated in articulated chains 54.

From an examination of the features of the machine 1 made according to the present invention the advantages that it allows to obtain are apparent.

Specifically, the use of a system of wheels carried by the counterweight 28 and operating in contact with the walls 24, 25, 26 of the upright 17 allows to eliminate the sliding guides normally used in the known applications, and therefore to considerably reduce the manufacturing costs of the upright 17

It is finally apparent that changes and variations can be implemented to the described machine 1 without however departing from the scope of protection defined by the claims.

The invention claimed is:

1. A coordinate measuring machine comprising a base provided with first guiding means along a first horizontal axis, a first carriage mobile on the base along said first axis and comprising an upright provided with second guiding means extending along a second vertical axis, a second carriage carried by the upright and sliding along said second axis, a horizontal-arm carried by the second carriage, extending along a third axis horizontal and orthogonal to the first axis and mobile along said third axis, and a counterweight accommodated within said upright mobile in direction substantially parallel to said second axis and secured to said second carriage by a flexible transmission member, wherein said counterweight is guided within said upright by a plurality of wheels carried by said counterweight.

2. A machine according to claim 1, wherein the wheels of the counterweight roll in direct contact with side walls of the upright.

3. A machine according to claim 2, wherein said side walls of the upright are free from guides for the counterweight.

4. A machine according to claim 1, wherein said wheels are arranged so as to define an anchoring system which eliminates of freedom from said counterweight except for shifting along said third axis.

5. A machine according to claim 4, wherein said anchoring system is isostatic.

6. A machine according to claim 1, wherein parallelly to said first axis and to said third axis the counterweight is supported in one direction by a plurality of fixed axis first wheels and in the other another direction by a second wheel elastically supported on said counterweight.

7. A machine according to claim 6, wherein said second wheels are mounted on respective blade springs.

8. A machine according to claim 1, wherein said upright presents a rectangular section cavity accommodating said counterweight and wherein the counterweight presents an essentially parallelepiped shape.

9. A machine according to claim 8, wherein the counterweight includes three first wheels not aligned to its first face (38) perpendicular to the first axis and a second wheel on its second face opposite to said first face.

10. A machine according to claim 8, characterised wherein the counterweight is provided with includes two first wheels on its third face perpendicular to the third axis and a second wheel on its fourth face opposite to said third face.

11. A machine according to claim 1, wherein said wheels comprise a portion of elastomeric material.

12. A machine according to claim 1, wherein the side walls of said upright have a rough finish.

13. A machine according to claim 1, wherein said upright presents a tubular structure defined by a C-section and by a plate fixed to the free sides of said section.

* * * * *

UNITED STATES PATENT AND TRADEMARK OFFICE
CERTIFICATE OF CORRECTION

PATENT NO. : 7,779,549 B2
APPLICATION NO. : 12/297429
DATED : August 24, 2010
INVENTOR(S) : Enrico Garau It is certified that error appears in the above-identified patent and that said Letters Patent is hereby corrected as shown below:

IN THE CLAIMS

Column 4, line 24, claim 4, after the word "eliminates" delete the word "of".

Column 4, line 30, claim 6, after the words "wheels and in" delete the words "the other".

Column 4, line 42, claim 10, after the words "claim 8" delete the word "characterised".

Column 4, line 43, claim 10, after the words "the counterweight" delete the words "is provided with".

Signed and Sealed this
Eighth Day of February, 2011

David J. Kappos
*Director of the United States Patent and Trademark Office*